US012717921B2

(12) United States Patent
Swami

(10) Patent No.: US 12,717,921 B2
(45) Date of Patent: Aug. 25, 2026

(54) SYSTEM AND METHOD FOR RESTORING DATA OF A VIRTUAL MACHINE WITH PATCHING OF MALICIOUS FILES

(71) Applicant: Druva Inc., Santa Clara, CA (US)

(72) Inventor: Uday Sanjay Swami, Pune (IN)

(73) Assignee: DRUVA INC., Santa Clara, CA (US)

( * ) Notice: Subject to any disclaimer, the term of this patent is extended or adjusted under 35 U.S.C. 154(b) by 79 days.

(21) Appl. No.: 18/768,867

(22) Filed: Jul. 10, 2024

(65) Prior Publication Data

US 2025/0363217 A1 Nov. 27, 2025

(30) Foreign Application Priority Data

May 21, 2024 (IN) ............................ 202441039533

(51) Int. Cl.
*G06F 21/00* (2013.01)
*G06F 21/56* (2013.01)

(52) U.S. Cl.
CPC .......... *G06F 21/568* (2013.01); *G06F 21/565* (2013.01)

(58) Field of Classification Search
CPC ............................ G06F 21/568; G06F 21/565
See application file for complete search history.

(56) References Cited

U.S. PATENT DOCUMENTS 10,079,842 B1 * 9/2018 Brandwine ......... H04L 63/1441
12,248,435 B2 * 3/2025 Sinha .................. G06F 16/1734
2021/0044604 A1 * 2/2021 Annen ................ G06F 11/1435
2022/0035905 A1 * 2/2022 Lu .......................... G06F 21/56
2022/0292192 A1 * 9/2022 Nanivadekar ........... G06F 21/53
2022/0345483 A1 * 10/2022 Shua ..................... H04L 9/0825
2023/0205891 A1 * 6/2023 Yellapragada ...... H04L 63/1416 726/25
2025/0036762 A1 * 1/2025 Nanivadekar ......... G06F 21/565
(Continued)

OTHER PUBLICATIONS

Li et al., "Secure Virtual Machine Execution under an Untrusted Management OS," 2010 IEEE 3rd International Conference on Cloud Computing, Miami, FL, USA, pp. 172-179 (Year: 2010).*
(Continued)

*Primary Examiner* — Morshed Mehedi
(74) *Attorney, Agent, or Firm* — Vorys, Sater, Seymour and Pease LLP

(57) ABSTRACT

The invention relates to a system and method for restoring data of a virtual machine. The system includes a memory for storing one or more processor-executable routines, and a processor communicatively coupled to the memory to execute the one or more processor-executable routines to access a plurality of virtual machine snapshots of the virtual machine from a storage. The snapshots include block-level snapshots. The processor is configured to scan the plurality of virtual machine snapshots to identify one or more malicious files present in the snapshots, and generate a report with details of malicious files present in the snapshots. The processor is configured to implement a first workflow to patch the identified malicious files while restoring the data. The processor is further configured to implement a second workflow to identify snapshots that comprise block signatures similar to the malicious files and to mark the identified snapshots as malicious snapshots.

20 Claims, 5 Drawing Sheets

(56) References Cited

U.S. PATENT DOCUMENTS

| | | | | |
|---|---|---|---|---|
| 2025/0055869 | A1* | 2/2025 | Barel | H04L 63/1433 |
| 2025/0272399 | A1* | 8/2025 | Sharma | G06F 21/565 |

OTHER PUBLICATIONS

Perkins et al., "automatically patching errors in deployed software", SOSP '09: Proceedings of the ACM SIGOPS 22nd symposium on Operating systems principles pp. 87-102, Published: (Oct. 11, 2009).*

* cited by examiner

SYSTEM AND METHOD FOR RESTORING DATA OF A VIRTUAL MACHINE WITH PATCHING OF MALICIOUS FILES

PRIORITY STATEMENT

The present application claims priority under 35 U.S.C. § 119 to Indian Patent Application number 202441039533 filed 21 May 2024 the entire contents of which are hereby incorporated herein by reference.

BACKGROUND

The invention generally relates to the field of virtual machines (VMs) and more particularly, to a system and method for restoring data of a virtual machine.

Generally, users may want to restore snapshots that are backed up at a storage to get information about applications running on a guest operating system (GuestOS). In case, a user restores the complete snapshot without patching the file and if the file is malicious or known to disrupt the application, the user won't be able to load the application in the GuestOS and also may not be able to perform any operations from the Guest OS.

Currently, users perform sandbox recovery of VMs to perform the aforesaid operations. However, in case a file is restricting the user to boot the VM or has changed access permissions, the user will not be able to perform any of these operations from the GuestOS.

Hence there is a need for a method and system to patch or restore a data file, without affecting any applications running on the VM. There is a need for a technique to assist the user to restore a snapshot with a malicious file while enduring protection of other data. Hence, an improved system and method for restoring data in a virtual machine is disclosed herein.

SUMMARY

The following summary is illustrative only and is not intended to be in any way limiting. In addition to the illustrative aspects, example embodiments, and features described, further aspects, example embodiments, and features will become apparent by reference to the drawings and the following detailed description.

Briefly, according to an example embodiment, a system for restoring data of a virtual machine is provided. The system includes a memory storing one or more processor-executable routines; and a processor communicatively coupled to the memory. The processor is configured to execute the one or more processor-executable routines to access a plurality of virtual machine snapshots of the virtual machine from a storage. The snapshots include block-level snapshots. The processor is further configured to scan the plurality of virtual machine snapshots to identify one or more malicious files present in the snapshots and generate a report with details of malicious files present in the snapshots. The processor is configured to implement a first workflow or a second workflow to restore the data of the virtual machine. The processor is configured to implement the first workflow to patch the identified malicious files while restoring the data and to implement the second workflow to identify snapshots that comprise block signatures similar to the malicious files and to mark the identified snapshots as malicious snapshots.

Briefly, according to another example embodiment, a system for restoring data of a virtual machine is provided. The system includes a memory storing one or more processor-executable routines; and a processor communicatively coupled to the memory. The processor is configured to execute the one or more processor-executable routines to access a plurality of virtual machine snapshots of the virtual machine from a storage. The snapshots include block-level snapshots. The processor is configured to scan the plurality of virtual machine snapshots to identify one or more malicious files present in the snapshots, and generate a report with details of malicious files present in the snapshots. Further the processor is configured to implement one of a first workflow and a second workflow to restore the data of the virtual machine. In an embodiment, the processor is configured to implement the first workflow to patch the identified malicious files while restoring the data, and the processor is configured to implement the second workflow to identify snapshots that comprise block signatures similar to the malicious files and to mark the identified snapshots as malicious snapshots. Furthermore, the processor is configured to generate audit information corresponding to the malicious file based on information related to a filesystem and block.

Briefly, according to another example embodiment, a method for restoring data of a virtual machine is provided. The method includes accessing a plurality of virtual machine snapshots of the virtual machine from a storage, wherein the snapshots comprise block-level snapshots, scanning the plurality of virtual machine snapshots to identify one or more malicious files present in the snapshots, and generating a report with details of malicious files present in the snapshots. The method further includes implementing one of a first workflow and a second workflow to restore the data of the virtual machine, where the first workflow comprises patching the identified malicious files while restoring the data, and the second workflow comprises identifying snapshots that comprise block signatures similar to the malicious files and marking the identified snapshots as malicious snapshots.

BRIEF DESCRIPTION OF THE FIGURES

These and other features, aspects, and advantages of the example embodiments will become better understood when the following detailed description is read with reference to the accompanying drawings in which like characters represent like parts throughout the drawings, wherein.

DETAILED DESCRIPTION OF EXAMPLE EMBODIMENTS

Figure 1:
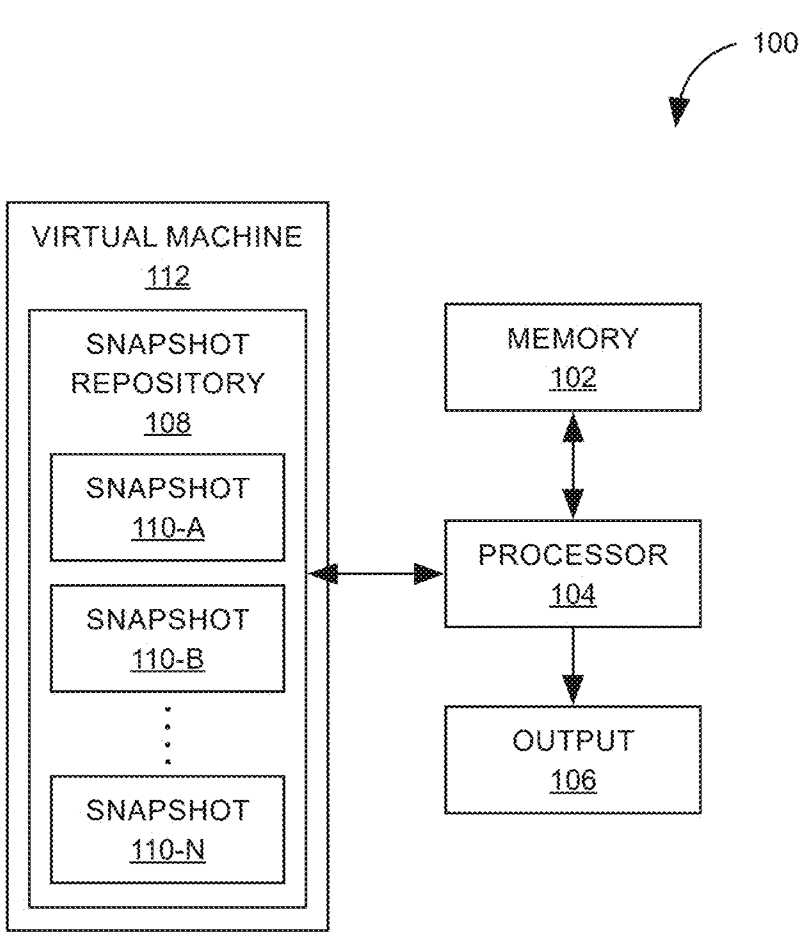
FIG. 1 is a block diagram of a system for restoring data of a virtual machine, according to some aspects of the present description.

Various example embodiments will now be described more fully with reference to the accompanying drawings in which only some example embodiments are shown. Specific structural and functional details disclosed herein are merely representative for purposes of describing example embodiments. Example embodiments, however, may be embodied in many alternate forms and should not be construed as limited to only the example embodiments set forth herein. On the contrary, example embodiments are to cover all modifications, equivalents, and alternatives thereof.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in a hardware, firmware, software, or a combination thereof.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figures. It should also be noted that in some alternative implementations, the functions/acts/steps noted may occur out of the order noted in the figures. For example, two figures shown in succession may, in fact, be executed substantially concurrently or may sometimes be executed in the reverse order, depending upon the functionality/acts involved.

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or a section. Thus, a first element, component, region, layer, or section discussed below could be termed a second element, component, region, layer, or section without departing from the scope of example embodiments.

Spatial and functional relationships between elements (for example, between modules) are described using various terms, including "connected," "engaged," "interfaced," and "coupled." Unless explicitly described as being "direct," when a relationship between first and second elements is described in the description below, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between", versus "directly between", "adjacent", versus "directly adjacent" etc.).

The terminology used herein is for the purpose of describing particular example embodiments only and is not intended to be limiting. Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless specifically stated otherwise, or as is apparent from the description, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Example embodiments of the present invention provide systems and methods for restoring data of a virtual machine.

FIG. 1 is a block diagram of a system 100 for restoring data of a virtual machine 112. The system 100 includes a memory 102, a processor 104 and an output 106. The memory 102 stores one or more processor-executable instructions, and the processor 104 is communicatively coupled to the memory 102 to execute one or more processor-executable routines. The output 106 can may be a display or a monitor that provides an output of the devices such as displaying details of malicious files detected for the virtual machine 112. The virtual machine 112 includes a snapshot repository 108 that includes a plurality of virtual machine snapshots such as represented by reference numerals 110*a*-110*n*.

The processor 104, is configured to access the plurality of virtual machine snapshots (e.g., snapshots 110*a*-110*n*) of the virtual machine 112 from a storage such as the snapshot repository 108. Each of the snapshots includes block-level snapshots. The virtual machine 112 is usually hosted on a disk. The processor 104 is further configured to scan the plurality of virtual machine snapshots 110*a*-110*n* to identify one or more malicious files present in the snapshots. The processor 104 is also configures to generate a report with details of the malicious files present in the snapshots. The report may be made available to the user of the system 100 via the output 106.

Further, the processor 104 is configured to implement one of a first workflow, a second workflow to restore the data of the virtual machine. In an embodiment, the processor 104 is configured to implement the first workflow to patch the identified malicious files while restoring the data. In another embodiment, the processor 104 is configured to implement the second workflow by identifying snapshots that comprise block signatures similar to the malicious files and to mark the identified snapshots as malicious snapshots.

In an embodiment, for implementing the first workflow, the processor 104, is configured to perform a read operation on the identified malicious files and record one or more metadata offsets of a meta block corresponding to the identified malicious files. Further the processor 104 is configured to obtain data blocks associated with the identified malicious files. The data blocks are obtained using the file blocks and the metadata offsets. The processor 104 is further configured to eliminate data blocks from the respective snapshots to restore a previous version of the snapshot. In an embodiment, the processor 104 changes a data block present at a disk offset to patch the one or more malicious files. Typically, the disk offset corresponds to the malicious file and is obtained during scan of a backup snapshot.

In the illustrated embodiment, a file system from a disk is mounted in a write mode in the first workflow. Once mounted, the processor 104 is configured to patch one or more malicious files with a previous safe snapshot using a file system operation. The processor 104 is further configured to couple the patched disk to the virtual machine.

Further, for implementing the second workflow, the processor 104, is configured to mark each snapshot with a data block checksum corresponding to the one or more identified malicious files. The processor 104, is further configured to query a database for data blocks based on the data block checksum. The processor 104, marks a snapshot as infected based on a change in block version for a corresponding file. The processor 104, is further configured to quarantine the malicious file in a back-up copy of the snapshot, where one or more write operations are allowed on snapshot disks. In an embodiment, the processor 104, is configured to generate audit information corresponding to the malicious file and based on information related to a filesystem and block. In another embodiment, the processor 104 quarantines the malicious file in a backup copy of the snapshot, where write operations are allowed on snapshot disks.

In an embodiment, the system 100 for restoring data of the virtual machine comprises a processor configured to access a plurality of virtual machine snapshots of the virtual machine from a storage, wherein the snapshots comprise block-level snapshots, scan the plurality of virtual machine snapshots to identify one or more malicious files present in the snapshots, generate a report with details of malicious files present in the snapshots, implement one of a first workflow and a second workflow to restore the data of the virtual machine, wherein the processor is configured to implement the first workflow to patch the identified malicious files while restoring the data, and the processor is configured to implement the second workflow to identify snapshots that comprise block signatures similar to the malicious files and to mark the identified snapshots as malicious snapshots, and generate audit information corresponding to the malicious file based on information related to a filesystem and block. A detailed process flow of restoring data of a virtual machine is explained with reference to FIG. 2.

Figure 2:
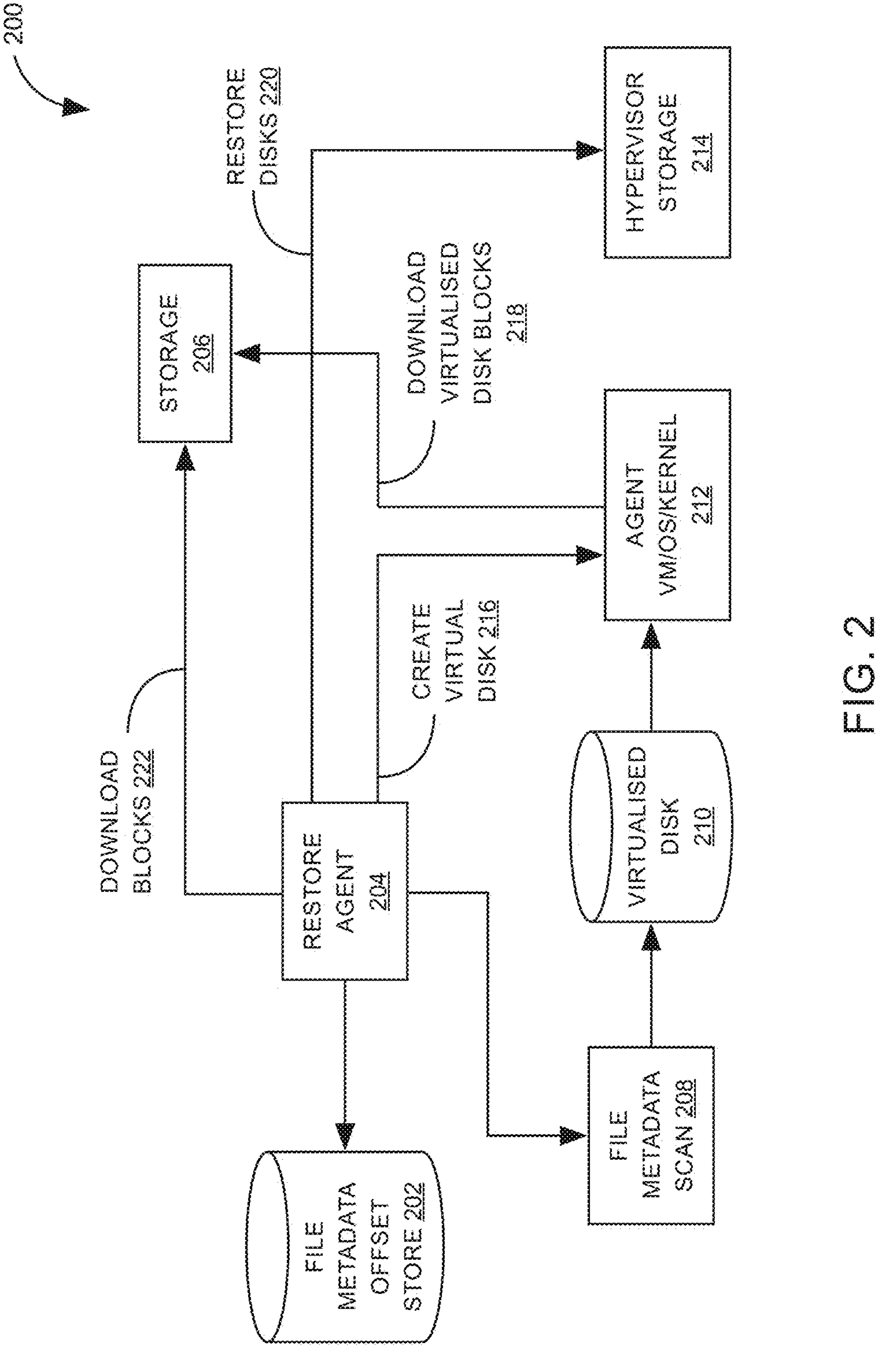
FIG. 2 illustrates a flow diagram for restoring data of a virtual machine, according to some aspects of the present description.

FIG. 2 is a flow diagram 200, illustrating the process of restoring data of a virtual machine, according to some aspects of the present invention. The system 100 may further include a file-metadata offset store 202, a restore agent 204, a storage 206, a file metadata scan 208, a virtualized disk 210, an agent virtual machine/operating system 212, and a hypervisor storage 214. At block 216, the restore agent 204, creates virtual disks and couples it with the agent virtual machine/operating system/kernel 212. At block 218, the storage 206, downloads the virtualised disk blocks from the agent VM/OS/kernel 212. At block 220, the restore agent 204 is configured to restore disks into the hypervisor storage 214. At block 222, the blocks are downloaded to the storage 204.

Typically, the flow diagram 200, describes operation of a multiple workflows as explained below. For a VM level backup where VM snapshots are block level and retrieved from hypervisor storage, after doing a scan of the backed-up snapshot, two workflows may follow up on the scan report. As described previously, in a first workflow, the snapshot is scanned, and reports are generated with malicious file details. The first workflow further includes patching malicious files during restore operation. The patching is performed when a user wants to remove or patch a malicious file during restore with zero data or any previous version of the file from safe snapshots or quarantine the malicious file. For example, if a malicious file F1 of a disk D1 is to be patched in a virtual machine VM1, and a there is a guest partition file system FS1, the solution may be applied in two stages.

A metadata scan is performed as a first step (208), that will result into offsets of the disk's (D1) where information about file's (F1) metadata is stored by the partition filesystem (FS1). In this embodiment, metadata scan may be performed by implementing understanding of the filesystem via a software code or by using available filesystem drivers. When the metadata offsets (MO) are recorded successfully within the file (F1), the system can perform a READ operation on the file to get all the blocks (FB) associated with the file (F1). Alternately, the system may utilize file system implementation/driver to determine the data blocks of the file (F1). The data blocks of the file will be DB (Data Blocks)=FB (File Blocks)–MB (Meta Blocks). During the restore operation, the data blocks or data from previous snapshots are zeroed out.

At a file system level, instead of determining metadata offsets of the file F1, the filesystem may be mounted from the disk in a write Mode and zero out or patch the file with a previous safe snapshot. For example, for completely restoring a VM, disk restore operation needs to be performed, wherein the VM is created before powering it on, and the disks has to be mounted on a proxy. Further, the file needs to be patched using the filesystem operations. The patched disk is subsequently attached, to the VM and then powered on.

In a second workflow, all snapshots from a versioned storage are marked as malicious if they contain same or similar block signature as that of the malicious file. Details of the second workflow is explained in a flow diagram in FIG. 3

Figure 3:
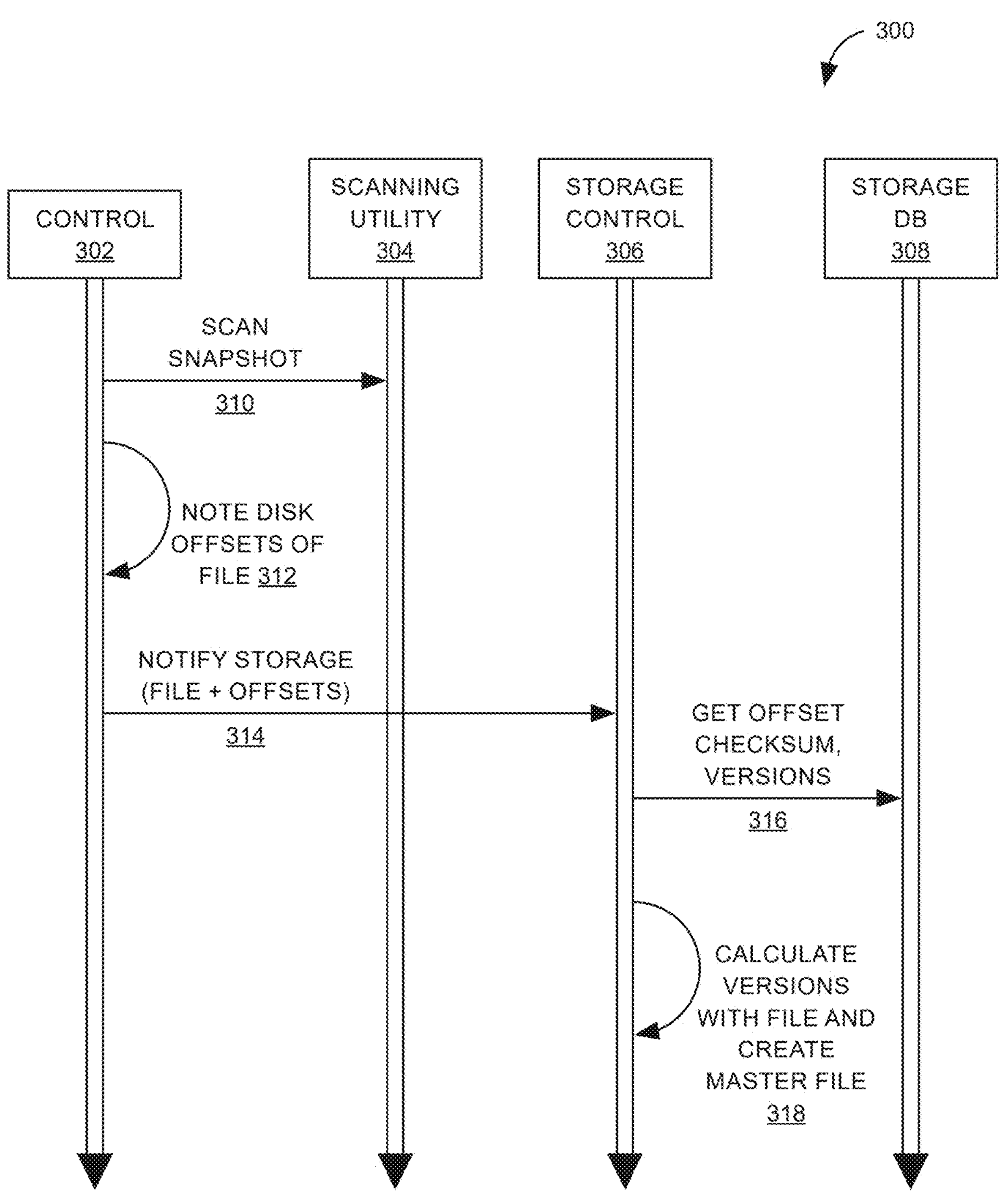
FIG. 3 illustrates a flow diagram of a workflow for marking a snapshot as malicious, according to some aspects of the present description.

FIG. 3 illustrates a flow diagram 300, of the second workflow for marking a snapshot as malicious, according to some aspects of the present description.

The flow diagram illustrates communication between a control 302, a scanning utility 304, a storage control 306, and a storage database (DB) 308, all of which are components of the system for restoring data of a virtual machine in an embodiment. At block 310, the control 302, transmits a signal to the scanning utility 304 to scan a snapshot. At block 312, upon scanning a snapshot, the control 302, notes one or more disk offsets of a file corresponding to the snapshot.

At block 314, the control 302, notifies the storage control 306 of the file and the one or more disk offsets. At block 316, offsets, checksum and versions of the file are obtained from the storage database 308. At block 318, the versions of the file are calculated, for creating a master file, by the storage control 306.

In an embodiment, if a malware is detected in a snapshot using a scanning tool such as a custom finder, then all snapshots are marked with the same data block checksum, as the affected region of the malware file This will optimize scanning needed across multiple snapshots in a versioned storage, query database for file system blocks identified during scan process and mark snapshot based on block change version for a particular file. For example, a file has blocks of size 1 Mb on a disk. In such a case, for snapshots 1 to 5 (B1), a created version can include snapshot 1, and a deleted version can include snapshot 5. Further, for snapshot 6 to snapshot 7 (B1'), a created version can include snapshot 6, and a deleted version can include snapshot 7. Furthermore, for snapshot 1 to snapshot 7 (B2), a malicious file can be detected by combining B1 and B2, and an unknown file can be created B1' and B2.

In a third workflow, a patch file can be excluded in a backup. If a scan is done during each backup on the snapshot of a virtual machine, then the disk offsets may be determined using the above method. This information can be subsequently used to zero out the data or exclude the file in the backed-up copy of the snapshot. In this case, the data block itself is changed in a backup operation. In an embodiment, the file in a backed-up copy can be quarantined, for performing write operations on the snapshot copy. Further, this may involve creating mutable copy of the snapshot if the hypervisor does not allow write operations on the snapshot disks. Further, a user space can be maintained in a filesystem on which specific write operations are maintained separately which can be used during backup.

In a fourth workflow, an audit information can be generated about the malware file depending on a block analysis and filesystem information like mtime/stime.

Figure 4:
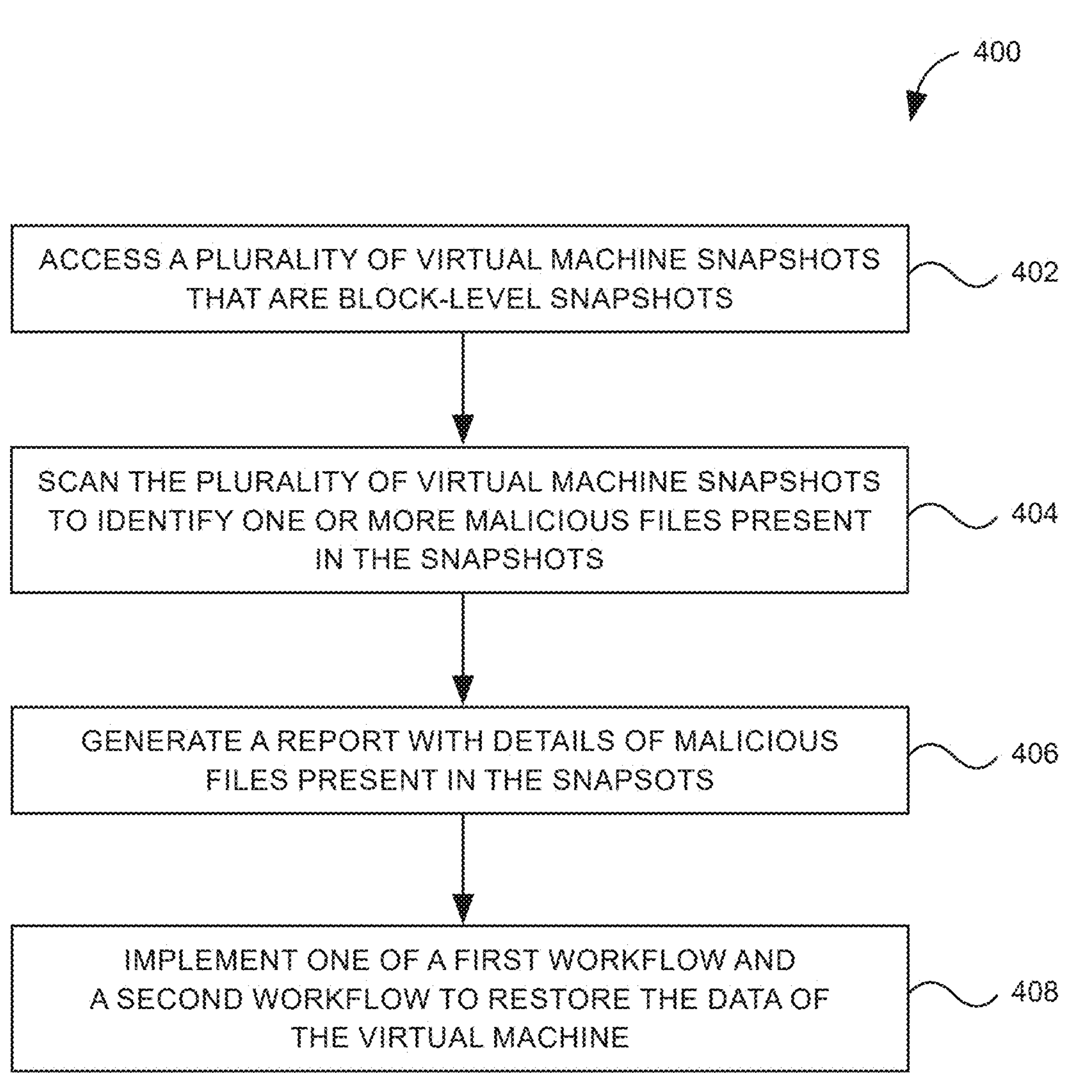
FIG. 4 illustrates a flowchart for method of restoring data of a virtual machine, according to some aspects of the present description.

A method for restoring data of a virtual machine is explained further with reference to FIG. 4.

FIG. 4 discloses a flowchart 400 disclosing a method for restoring data of a virtual machine in accordance with embodiments of present invention.

At 402, a plurality of virtual machines snapshots of the virtual machine are accessed from a storage. In an embodiment, the snapshots comprise block-level snapshots.

At 404, the plurality of virtual machine snapshots is scanned to identify one or more malicious files present in the snapshots.

At 406, a report is generated with details of malicious files present in the snapshots.

At 408, either a first workflow or a second workflow is implemented to restore the data of the virtual machine. The first workflow comprises patching the identified malicious files while restoring the data, and the second workflow comprises identifying snapshots that comprise block signatures similar to the malicious files and marking the identified snapshots as malicious snapshots.

While implementing the first workflow, a read operation is performed on the identified malicious files. One or more metadata offsets of a meta block corresponding to the identified malicious files are recorded. The data blocks associated with the identified malicious files are obtained where the data blocks are obtained using the file blocks and the metadata offsets. Further, the data blocks are eliminated from the respective snapshots to restore a previous version of the snapshot. In an embodiment, the first workflow comprises mounting a file system from a disk in a write mode. One or more malicious files are patched with a previous snapshot using file system operations, and the patched disk is coupled to a virtual machine.

The second workflow includes marking each snapshot with a data block checksum corresponding to the one or more identified malicious files, querying a database for data blocks based on the data block checksum, and marking a snapshot as infected based on a change in block version of a corresponding file. Further, patching the one or more malicious files further comprises quarantining the malicious file in a back-up copy of the snapshot, where write operations are allowed on snapshot disks. Further, the method includes generating an audit information corresponding to the malicious file based on information related to a filesystem and block.

The various actions, acts, blocks, steps, or the like in the flow chart (400) may be performed in the order presented, in a different order or simultaneously. Further, in some embodiments, some of the actions, acts, blocks, steps, or the like may be omitted, added, modified, skipped, or the like without departing from the scope of the invention.

Various advantages of the disclosed method and system exist. The disclosed method and system provide for lesser time in restoring data of the virtual machine. As a result, the process is more time efficient and consumes lesser computing and network resources. Further, patching of data as mentioned above solves the problem by not depending on the GuestOS to patch or zero out files. Disclosed method can be extended to an instant recovery (IR) which is usually not possible in a sandbox recovered virtual machine. By use of the present invention, the file is at rest and does not have any permissions from the native environment to perform any operation.

Figure 5:
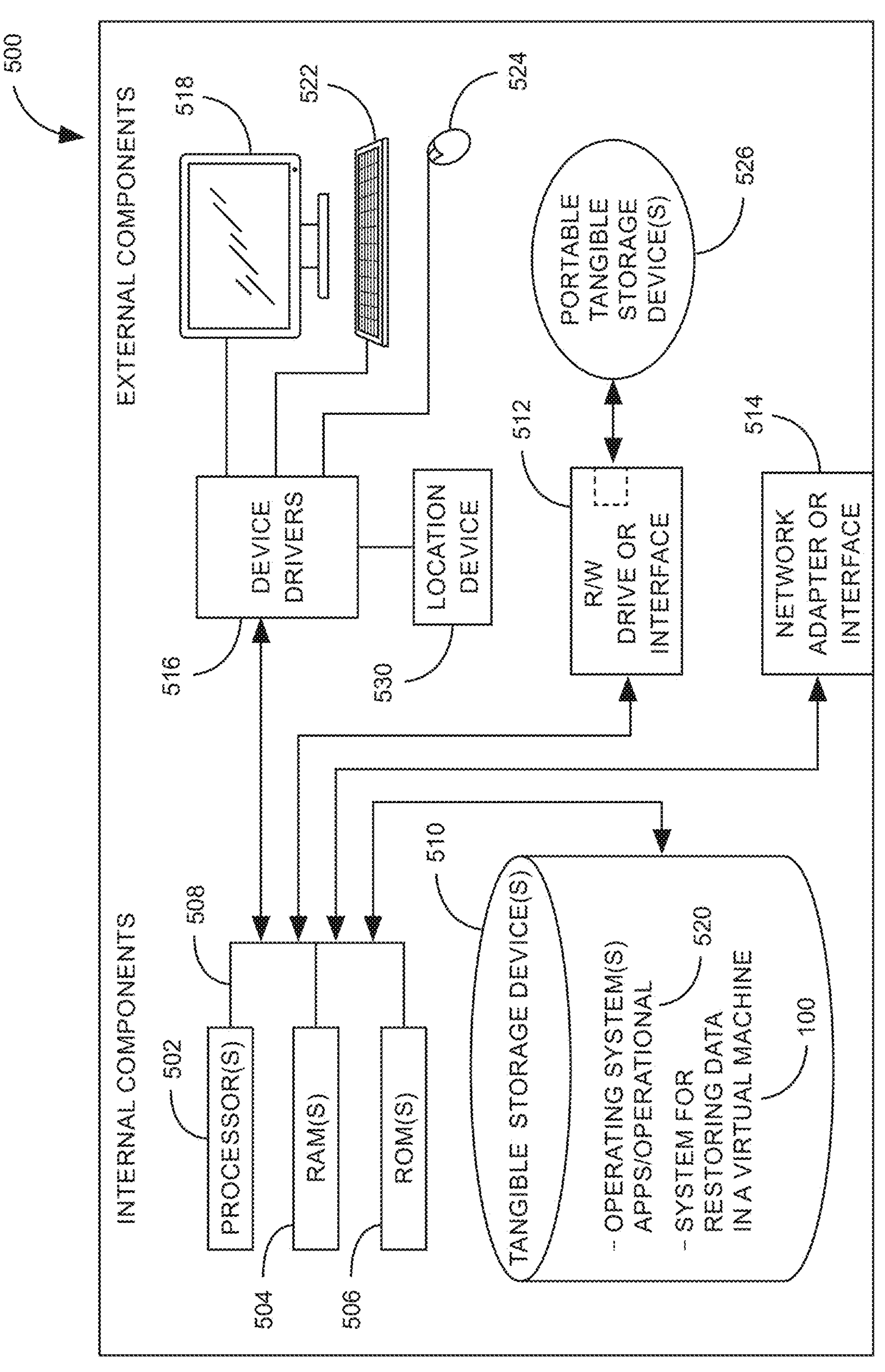
FIG. 5 is a block diagram of an embodiment of a computing device in which the modules of the system for restoring data of a virtual machine, described herein, are implemented.

The modules of the system (100) for restoring data of a virtual machine, described herein are implemented in computing devices. One example of a computing device (500) is described below in FIG. 5. The computing device (500) includes one or more processor(s) (502), one or more computer-readable RAMs (504) and one or more computer-readable ROMs (506) on one or more buses (508). Further, computing device (500) includes a tangible storage device (510) that may be used to execute operating systems (520) and the system (100). The various modules of the system (100) may be stored in the tangible storage device (510). Both, the operating systems (520) and the system (100) are executed by the one or more processor(s) (502) via one or more respective RAMs (504) (which typically include cache memory). The execution of the operating systems (520) and/or the system (100) by the one or more processor(s) (502), configures the one or more processor(s) (502) as a special purpose processor configured to carry out the functionalities of the operation systems (520) and/or the system (100) as described above.

Examples of the tangible storage device (510) include semiconductor storage devices such as ROM, EPROM, flash memory or any other computer-readable tangible storage device that may store a computer program and digital information.

Computing device (500) also includes a R/W drive or interface (514) to read from and write to one or more portable computer-readable tangible storage devices (528) such as a CD-ROM, DVD, memory stick or semiconductor storage device. Further, network adapters or interfaces (512) such as a TCP/IP adapter cards, wireless Wi-Fi interface cards, or 3G or 4G wireless interface cards or other wired or wireless communication links are also included in computing device.

In one example embodiment, the system (100) may be stored in the tangible storage device (510) and may be downloaded from an external computer via a network (for example, the Internet, a local area network or other, wide area network) and network adapter or interface (512).

Computing device (500) further includes device drivers (516) to interface with input and output devices. The input and output devices may include a computer display monitor (518), a keyboard (522), a keypad, a touch screen, a computer mouse (524), and/or some other suitable input device.

In this description, including the definitions mentioned earlier, the term 'module' may be replaced with the term 'circuit.' The term 'module' may refer to, be part of, or include processor hardware (shared, dedicated, or group) that executes code and memory hardware (shared, dedicated, or group) that stores code executed by the processor hardware. The term code, as used above, may include software, firmware, and/or microcode, and may refer to programs, routines, functions, classes, data structures, and/or objects.

Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above. Shared memory hardware encompasses a single memory device that stores some or all code from multiple modules. Group memory hardware encompasses a memory device that, in combination with other memory devices, stores some or all code from one or more modules.

In some embodiments, the module may include one or more interface circuits. In some examples, the interface circuits may include wired or wireless interfaces that are connected to a local area network (LAN), the Internet, a wide area network (WAN), or combinations thereof. The functionality of any given module of the present description may be distributed among multiple modules that are connected via interface circuits. For example, multiple modules may allow load balancing. In a further example, a server (also known as remote, or cloud) module may accomplish some functionality on behalf of a client module.

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

While only certain features of several embodiments have been illustrated, and described herein, many modifications and changes will occur to those skilled in the art. It is, therefore, to be understood that the appended claims are intended to cover all such modifications and changes as fall within the true spirit of inventive concepts.

The aforementioned description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification. It should be understood that one or more steps within a method may be executed in different order (or concurrently) without altering the principles of the present disclosure. Further, although each of the example embodiments is described above as having certain features, any one or more of those features described with respect to any example embodiment of the disclosure may be implemented in and/or combined with features of any of the other embodiments, even if that combination is not explicitly described. In other words, the described example embodiments are not mutually exclusive, and permutations of one or more example embodiments with one another remain within the scope of this disclosure.

The example embodiment or each example embodiment should not be understood as a limiting/restrictive of inventive concepts. Rather, numerous variations and modifications are possible in the context of the present disclosure, in particular those variants and combinations which may be inferred by the person skilled in the art with regard to achieving the object for example by combination or modification of individual features or elements or method steps that are described in connection with the general or specific part of the description and/or the drawings, and, by way of combinable features, lead to a new subject matter or to new method steps or sequences of method steps, including insofar as they concern production, testing and operating methods. Further, elements and/or features of different example embodiments may be combined with each other and/or substituted for each other within the scope of this disclosure.

Still further, any one of the above-described and other example features of example embodiments may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Further, at least one example embodiment relates to a non-transitory computer-readable storage medium comprising electronically readable control information (e.g., computer-readable instructions) stored thereon, configured such that when the storage medium is used in a controller of a magnetic resonance device, at least one example embodiment of the method is carried out.

Even further, any of the aforementioned methods may be embodied in the form of a program. The program may be stored on a non-transitory computer readable medium, such that when run on a computer device (e.g., a processor), cause the computer-device to perform any one of the aforementioned methods. Thus, the non-transitory, tangible computer readable medium is adapted to store information and is adapted to interact with a data processing facility or computer device to execute the program of any of the above-mentioned embodiments and/or to perform the method of any of the above-mentioned embodiments.

The computer readable medium or storage medium may be a built-in medium installed inside a computer device main body or a removable medium arranged so that it may be separated from the computer device main body. The term computer-readable medium, as used herein, does not encompass transitory electrical or electromagnetic signals propagating through a medium (such as on a carrier wave), the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices), volatile memory devices (including, for example static random access memory devices or a dynamic random access memory devices), magnetic storage media (including, for example an analog or digital magnetic tape or a hard disk drive), and optical storage media (including, for example a CD, a DVD, or a Blu-ray Disc). Examples of the media with a built-in rewriteable non-volatile memory, include but are not limited to memory cards, and media with a built-in ROM, including but not limited to ROM cassettes, etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave), the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices), volatile memory devices (including, for example static random access memory devices or a dynamic random access memory devices), magnetic storage media (including, for example an analog or digital magnetic tape or a hard disk drive), and optical storage media (including, for example a CD, a DVD, or a Blu-ray Disc). Examples of the media with a built-in rewriteable non-volatile memory, include but are not limited to memory cards, and media with a built-in ROM, including but not limited to ROM cassettes, etc. Furthermore, various information regarding stored images, for example, property information, may be stored in any other form, or it may be provided in other ways.

The apparatuses and methods described in this application may be partially or fully implemented by a special purpose computer created by configuring a general-purpose computer to execute one or more particular functions embodied in computer programs. The functional blocks and flowchart elements described above serve as software specifications, which may be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

What is claimed is:

1. A system for restoring data of a virtual machine, wherein the system comprises:

a memory storing one or more processor-executable routines; and a processor communicatively coupled to the memory, the processor configured to execute the one or more processor-executable routines to:

access a plurality of virtual machine snapshots of the virtual machine from a storage, wherein the snapshots comprise block-level snapshots;

scan the plurality of virtual machine snapshots to identify one or more malicious files present in the snapshots;

generate a report with details of malicious files present in the snapshots; and implement one of a first workflow and a second workflow to restore the data of the virtual machine, wherein the processor is configured to implement the first workflow to patch the identified malicious files during restoration by eliminating malicious data blocks from the snapshots and replacing them with data from previous safe snapshots, and wherein the processor is configured to implement the second workflow to identify snapshots that comprise block signatures matching the malicious files and to mark the identified snapshots as malicious snapshots based on block version changes.

2. The system of claim 1, wherein the processor is further configured to implement the first workflow to:

perform a read operation on the identified malicious files;

record one or more metadata offsets of a meta block corresponding to the identified malicious files;

obtain data blocks associated with the identified malicious files, wherein the data blocks are obtained using the file blocks and the metadata offsets; and eliminate the malicious data blocks from the respective snapshots and replace them with data from previous safe snapshots to restore a previous version of the snapshot.

3. The system of claim 2, wherein the processor is further configured to implement the first workflow to:

mount a file system from a disk in write mode;

patch one or more malicious files with a previous safe snapshot using file system operations; and couple the patched disk to the virtual machine.

4. The system of claim 1, wherein the processor is further configured to implement the second workflow to:

mark each snapshot with a data block checksum corresponding to the one or more identified malicious files;

query a database for data blocks based on the data block checksum; and mark a snapshot as infected based on a change in block version for a corresponding file, wherein the block signatures match the malicious files.

5. The system of claim 4, wherein the processor is further configured to change a data block present at a disk offset to patch the one or more malicious files, wherein the disk offset corresponds to the malicious file and is obtained during scan of a backup of the snapshot.

6. The system of claim 4, wherein the processor is further configured to quarantine the malicious file in a back-up copy of the snapshot, wherein write operations are allowed on snapshot disks.

7. The system of claim 1, wherein the processor is further configured to generate audit information corresponding to the malicious file and based on information related to a filesystem and block.

8. A system for restoring data of a virtual machine, wherein the system comprises:

a memory storing one or more processor-executable routines; and a processor communicatively coupled to the memory, the processor configured to execute the one or more processor-executable routines to:

access a plurality of virtual machine snapshots of the virtual machine from a storage, wherein the snapshots comprise block-level snapshots;

scan the plurality of virtual machine snapshots to identify one or more malicious files present in the snapshots;

generate a report with details of malicious files present in the snapshots;

implement one of a first workflow and a second workflow to restore the data of the virtual machine, wherein the processor is configured to implement the first workflow to patch the identified malicious files during restoration by eliminating malicious data blocks from the snapshots and replacing them with data from previous safe snapshots, and wherein the processor is configured to implement the second workflow identify snapshots that comprise block signatures matching the malicious files and to mark the identified snapshots as malicious snapshots based on block version changes; and generate audit information corresponding to the malicious file based on information related to a filesystem and block.

9. The system of claim 8, wherein the processor is further configured to implement the first workflow to:

perform a read operation on the identified malicious files;

record one or more metadata offsets of a meta block corresponding to the identified malicious files;

obtain data blocks associated with the identified malicious files, wherein the data blocks are obtained using the file blocks and the metadata offsets; and eliminate the malicious data blocks from the respective snapshots and replace them with data from previous safe snapshots to restore a previous version of the snapshot.

10. The system of claim 8, wherein the processor is further configured to implement the first workflow to:

mount a file system from a disk in write mode;

patch one or more malicious files with a previous safe snapshot using file system operations; and couple the patched disk to the virtual machine.

11. The system of claim 8, wherein the processor is further configured to implement the second workflow to:

mark each snapshot with a data block checksum corresponding to the one or more identified malicious files;

query a database for data blocks based on the data block checksum; and mark a snapshot as infected based on a change in block version for a corresponding file.

12. The system of claim 11, wherein the processor is further configured to change a data block present at a disk offset to patch the one or more malicious files, wherein the disk offset corresponds to the malicious file and is obtained during scan of a backup of the snapshot.

13. The system of claim 11, wherein the processor is further configured to quarantine the malicious file in a back-up copy of the snapshot, wherein write operations are allowed on snapshot disks.

14. A method for restoring data of a virtual machine, the method comprising:

accessing a plurality of virtual machine snapshots of the virtual machine from a storage, wherein the snapshots comprise block-level snapshots;

scanning the plurality of virtual machine snapshots to identify one or more malicious files present in the snapshots;

generating a report with details of malicious files present in the snapshots; and implementing one of a first workflow and a second workflow to restore the data of the virtual machine, wherein the first workflow comprises patching the identified malicious files during restoration by eliminating malicious data blocks from the snapshots and replacing them with data from previous safe snapshots, and the second workflow comprises identifying snapshots that comprise block signatures matching the malicious files and to mark the identified snapshots as malicious snapshots based on block version changes.

15. The method of claim 14, wherein implementing the first workflow comprises:

performing a read operation on the identified malicious files, wherein performing the read operation further comprises determining the allocated regions in the file system using a processor-executable routine;

recording one or more metadata offsets of a meta block corresponding to the identified malicious files;

obtaining data blocks associated with the identified malicious files, wherein the data blocks are obtained using the file blocks and the metadata offsets; and eliminating the malicious data blocks from the respective snapshots and replace them with data from previous safe snapshots to restore a previous version of the snapshot.

16. The method of claim 14, wherein implementing the first workflow comprises:

mounting a file system from a disk in write mode;

patching one or more malicious files with a previous safe snapshot using file system operations; and coupling the patched disk to the virtual machine.

17. The method of claim 16, wherein implementing the second workflow comprises:

marking each snapshot with a data block checksum corresponding to the one or more identified malicious files;

querying a database for data blocks based on the data block checksum; and marking a snapshot as infected based on a change in block version for a corresponding file, wherein the block signatures match the malicious files.

18. The method of claim 16, wherein patching the one or more malicious files comprises changing a data block present at a disk offset, wherein the disk offset corresponds to the malicious file and is obtained during scanning a backup of the snapshot.

19. The method of claim 16, wherein patching the one or more malicious files further comprises quarantining the malicious file in a back-up copy of the snapshot, wherein write operations are allowed on snapshot disks.

20. The method of claim 14, further comprising generating an audit information corresponding to the malicious file and based on information related to a filesystem and block.

* * * * *